(12) United States Patent
Faris et al.

(10) Patent No.: US 8,972,458 B2
(45) Date of Patent: Mar. 3, 2015

(54) SYSTEMS AND METHODS FOR COMMENTS AGGREGATION AND CARRYOVER IN WORD PAGES

(75) Inventors: Andrew Boath Faris, Venice, CA (US); Anthony Dominic Amidei, Santa Monica, CA (US); Joshua Allen Rehling, Santa Monica, CA (US); Stephen Garcia, Santa Monica, CA (US)

(73) Assignee: Yahoo! Inc., Sunnyvale, CA (US)

( * ) Notice: Subject to any disclaimer, the term of this patent is extended or adjusted under 35 U.S.C. 154(b) by 655 days.

(21) Appl. No.: 11/836,723

(22) Filed: Aug. 9, 2007

(65) Prior Publication Data

US 2009/0043814 A1   Feb. 12, 2009

(51) Int. Cl.
*G06F 17/30* (2006.01)
*G06F 17/24* (2006.01)

(52) U.S. Cl.
CPC ........ *G06F 17/30038* (2013.01); *G06F 17/241* (2013.01)
USPC .......................................................... 707/803

(58) Field of Classification Search
USPC .......................................................... 707/803
See application file for complete search history.

(56) References Cited

U.S. PATENT DOCUMENTS

| | | | |
|---|---|---|---|
| 5,671,428 A * | 9/1997 | Muranaga et al. | 715/751 |
| 6,243,722 B1 | 6/2001 | Day et al. | |
| 6,658,623 B1 | 12/2003 | Schilit et al. | |
| 6,865,713 B1 | 3/2005 | Bates et al. | |
| 2003/0101237 A1* | 5/2003 | Ban et al. | 709/218 |
| 2003/0195928 A1* | 10/2003 | Kamijo et al. | 709/204 |
| 2003/0204490 A1 | 10/2003 | Kasriel | |
| 2005/0055628 A1 | 3/2005 | Chen | |
| 2008/0250327 A1* | 10/2008 | Li et al. | 715/745 |

* cited by examiner

*Primary Examiner* — Hosain Alam
*Assistant Examiner* — Johnese Johnson
(74) *Attorney, Agent, or Firm* — Martine Penilla Group, LLP

(57) ABSTRACT

A computer-implemented method for managing comment data generated when interacting with a page module is disclosed. At least one comment data being expressed by a user when interacting with the page module is detected and analyzed identify a context for the comment data. If the comment data is identified to be associate with a context, tagging the comment data with a context association, and if the comment data is not associated with a context then maintaining the comment data associated only with the page module. The comment data is then populated in the other page modules that were identified to have a context association with the comment data. The populating enables display presentation of the comment data made at the page module at the one or more page modules having the context association.

19 Claims, 5 Drawing Sheets

SYSTEMS AND METHODS FOR COMMENTS AGGREGATION AND CARRYOVER IN WORD PAGES

CROSS REFERENCE TO RELATED APPLICATIONS

This Application is related to co-pending: (1) patent application Ser. No. 11/836,724, filed on Aug. 9, 2007, entitled "Systems and Methods for Dynamic Page Creation", (2) patent application Ser. No. 11/836,721, filed on Aug. 9, 2007, entitled "Systems and Methods for Providing Enhanced Portability in a Word Page Module", (3) patent application Ser. No. 11/836,719, filed on Aug. 9, 2007, entitled "Systems and Methods for Providing a Multi-function Search Box for Creating Word Pages", and, (4) patent application Ser. No. 11/836,717, filed on Aug. 9, 2007, entitled "Systems and Methods for Providing a Persistent Navigation Bar in a Word Page", each of which is incorporated herein by reference.

FIELD OF THE INVENTION

This invention generally relates to displaying information related to a given word. More specifically but without limitation, this invention relates to aggregating and carrying over user comments on a specific object in a page module of a word page to a contextually related module. User comments in various page modules are aggregated based on contextual relationships of content of the user comments and the content of page modules.

BACKGROUND OF THE INVENTION

The computing industry has seen many advances in recent years, and such advances have produced a multitude products and services. Internet websites are examples of products and services, which are created to give users access to particular types of services, data, or searching capabilities. Today, websites can be readily created by most individuals desiring to post information or provide access or connectivity to other data. Websites are also created, updated, and supported to provide constantly updated current event information, news, and other information. This data is highly managed and processed so that its presentation can be easily displayed on web browsers or other Internet connected devices.

Currently to date, however, the traditional web sites provide mostly unstructured and contextually unrelated information to a user. For example, when a phrase is searched, resulting web page typically displays many links to external websites. These links to external websites are typically selected to be displayed on the web page based on phrase matching criteria without any consideration for user interactivity and/or contextual relationship with the searched phrase. Generally, the user is forced to visit many external websites associated with presented links to find more information about the searched phrase. Furthermore, users that interface with certain websites may wish to know what is being said or communicated in related websites. However, current communication or interactivity with given websites limits the sharing of data or comments with users of a single site. Thus, commentary or information expressed in some websites is not known to user or visitors of sites where knowledge of such information may be relevant.

It is within this context that embodiments of the invention arise.

SUMMARY OF INVENTION

Broadly speaking, the present invention fills these needs by providing systems and methods for contextually relating content of user comments with content of web pages. Hence, for example, a user comment for an object in the page 1 would be carried over to the page 2 in a website if page 2 is contextually related to the subject matter of the user comment for the page 1. The embodiments of present invention enable users to express opinions about the displayed content by entering comments for an object in the display content or a part thereof in the web page. The user comments are stored in a persistent storage either locally or remotely on a central relational database. In another embodiment, a combination of various types of data stores such a relational databases, object databases, active directory server, LDAP server, etc. may be employed for storing user comments.

In one embodiment, a computer-implemented method for managing comment data generated when interacting with a page module is disclosed. At least one comment data being expressed by a user when interacting with the page module is detected and analyzed identify a context for the comment data. If the comment data is identified to be associate with a context, tagging the comment data with a context association, and if the comment data is not associated with a context then maintaining the comment data associated only with the page module. The comment data is then populated in the other page modules that were identified to have a context association with the comment data. The populating enables display presentation of the comment data made at the page module at the one or more page modules having the context association.

In another embodiment, a computer-implemented method of aggregating and carrying over comments in a page module is disclosed. In this embodiment, a user is enabled to enter a comment on an object in the page module. Based on the context of the entered comment, contextually related page modules are identified. The entered comment is associated with the page module in which the comment is entered. The entered comment is also associated with at least one the related page modules. The association or relationship between the entered comment and the page module in which the comment was entered is stored in a relational database. The association or relationship between the entered comment and the contextually related page modules is also stored in a relational database.

In yet another embodiment, a computer-implemented method of enabling a user to add a comment to a selected part of a visual object in a page module is disclosed. In this embodiment, a user is enabled to mark the selected part of the visual object in the page module. The user is then enabled to add the comment to the selected part of the visual object in the page module. An internal identification of the selected part is generated. The internal identification includes identification of the page module in which the selected object is residing. The internal identification of the selected part is then associated with the entered comment.

The advantages of the present invention are numerous. Most notably, the system and apparatus described herein provide better integration of various content in the web site and increase user interactivity with the web site. The newest and context related user comments are aggregated in the web pages that are contextually related to the user comments entered elsewhere in the web site. The user comments entered in a web page are carried over to other web pages based on contextual relationships, thus providing a seamless integration of content of various web pages in the web site.

Other aspects and advantages of the present invention will become apparent from the following detailed description, taken in conjunction with the accompanying drawings, illustrating by way of example the principles of the present invention.

BRIEF DESCRIPTION OF DRAWINGS

The present invention will be readily understood by the following detailed description in conjunction with the accompanying drawings. To facilitate this description, like reference numerals designate like structural elements.

Figure 1:
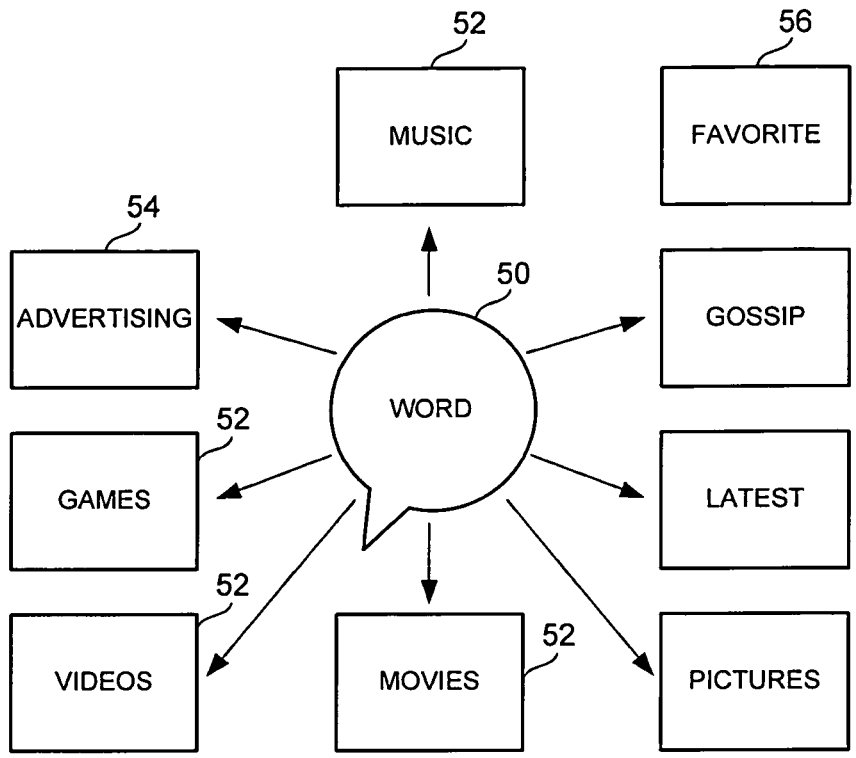
FIG. 1 illustrates a broad relationship between a word and different types of page modules, in accordance with one embodiment of the present invention.

The figures are provided in order to provide a thorough understanding of the present invention. The figures should not be construed as limiting the breath of the invention in any manner.

DETAILED DESCRIPTION

A system and apparatus for aggregating and carrying over user comments on content of a word page is disclosed. User comments are aggregated and carried over based on contextual relationships of content of various page modules and the user comments. The users interact with the page module in a "word page" and enter user comments on the page module, or on an object such as a picture in the page module, or on a selected part of the object. A "word page" includes page modules that present content having specific context. Context can be defined based on types of media, or categories with a type of media. In one embodiment, a "vertical" defines a type of media, such as music, movies, communication, shopping, gaming, etc. Within each vertical, further contextual categories can be defined. For instance, within music, a context can be defined for types of music, each artist, etc. Thus, for purposes of clarity, the degrees and granularity by which types of context can be broken up or organized can grow over time, as further context definitions are generated for words. The "word page", as used herein, is a web page, that is constructed from one or more page modules. The page modules, as noted above, will each define a type of content, such as movie related content, music related content, picture related content, game related content, video related content, gossip related content, etc. Thus, the word page is a contained page, that dynamically changes, depending on the selected or entered word. A word page is therefore not a search engine or search interface that triggers a search of web links or external websites. To the contrary, the word page will contain or generate one or more page modules, and the data that is presented in each of the page modules dynamically changes or is updated over time or based on the entered "word" in the multi-function search box or the selection of specific "words" within a particular page module of the word page.

As used herein, to be "contextually related" means that a particular word, that may be entered by a user is related to other words or phrases. Other words or phrases may be related in terms of context, and the context means that there is some weaving together of words, in terms of meaning, subject, or a combination thereof. Thus, words that are contextually related to other words or phrases may be connected in terms of coherence. Still further, context can be thought of in terms of parts of a discourse that surround a word or passage and can throw light on the meaning of the entered word. Some words, that are considered contextually related may be defined based on some descriptive interrelation, dependence, or condition, based on a theme, environment, setting, event, group of similar media, similar activities, or combinations thereof.

In one example, a user enters a comment on a specific content in a page module. The subject context of the specific content in the page module and the subject context of the comment are analyzed. The subject context analysis can be done programmatically or manually by the editors of the web site. The analyzing includes using stored relationships among words and content in a relational database. The subject context of the entered user comment is matched with the subject context of content of other page modules. Contextual relationship mappings of various page modules and comments are stored in a relational database. The user entered comment is carried over to other page modules that are matched by a contextual relationship analysis. In one embodiment, the analyzing is done manually by at least one of the editors who is knowledgeable in the specific vertical (e.g. content types). In other embodiment, the analyzing can be done programmatically by defining rules and using content relationships information stored in a relational database.

In another example, users enter comments in various page modules (such as "quotes", "music", etc. page modules) related to "Lindsay Lohan". The comments entered by the users would be aggregated and displayed together in a "buzz" page module displaying general information about "Lindsay Lohan". Users may also enter more comments in the "buzz" page modules or enter replies to one or more existing comments being displayed in the page module 52. These newly entered comments or replies to the comments are also analyzed to determine contextual relationships with the content of the word website. The analyzing includes searching and looking up tabular data in a relational database for finding relationships among page modules and various types of content. In one embodiment, the relationships are entered manually by the editors knowledgeable in a specific content type. In another embodiment, the relationships are constructed programmatically by defining rules to monitor browsing behavior of users and scanning current events and news to collect relationship information. For example, if a news in a daily newspaper features "SUBJECT A" and "SUBJECT B" together, a relationship between "SUBJECT A" and "SUBJECT B" is identified within the subject matter context of the feature in the news. If a contextual relationship is found, the comments or replies to the comments are tagged and carried over to contextually related page modules in the word website. When the contextually related page modules are displayed, the tagged comments that were found to be contextually related to the contextually related page modules are populated in the contextually related page modules.

With this overview in mind, the following figures will illustrate example structure and functionality of the multi-function search box in word pages.

FIG. 1 illustrates a word 50 and various broad types of page modules 52, sponsored modules 54, and, favorite module 56. Word 50 relates to a concept, person, brand, etc and functions as a carrier of meaning. In one embodiment, the page modules 52 are categorized by a specific type of content type such as music, movie, gossip, latest, etc. New content types may be added to create a new page module 52. The sponsored module 54 is a special type of module that is provided or built specifically to host selected sponsored content associated with a particular word 50.

In one embodiment, the favorite module 56 is a special type of page module that is used for storing pointers or references to page modules 52 that were previously marked as "favorite". In another embodiment, various user defined content or links to external resources, media, movie clips, albums, etc. may also be stored in the favorite module 56. In yet another embodiment, the favorite module 56 contains content specific to a particular user. Such content is added to the favorite module 56 through user action. In yet another embodiment, one or more page modules 52 are generated for the entered word 50 "favorite". The page modules 52 that are generated for the entered word 50 "favorite" contain user's favorite content in one or more vertical category such as music, movies, events, etc. User's favorite content in one embodiment is based on the logged in user's the user profile information including at least one of user's preferences, age, sexual orientation, geographical location. In another embodiment, if the user has not logged in, user's content browsing pattern and interactivity with the page modules is stored the cookies or temporary files which are then used to generate or assemble user's favorite content in various vertical content categories. In yet another embodiment, the generation of user's favorite content is based on a combination of user profile information and user's interactivity with the page modules 52 during one or more prior word website browsing sessions.

As illustrated in FIG. 1, word 50 surrounded by page modules 52, sponsored modules 54, and favorite module 56, signifies that a quest for information related to the word 50 leads to generation of various types of page modules 52 and sponsored modules 54, each hosting a specific type of content. FIG. 1 further illustrates that generation of the word page revolves around selection of the word 50, i.e. information displayed through various page modules 52 is focused on the selected word 50. For example, selecting "popular" for word 50 will generate a word page with the most popular content for each respective page module (such as popular movie, popular music, popular celebrity, popular fashion, popular club, etc.). A new word page including a different set of page modules 52, is generated every time a new word 50 is selected. Hence, in above example, when the selection changes from "popular" to "newest", a new word page including page modules 52 such as "newest movies", "newest music album", "newest car models", etc. will be generated. In one example, the word page for word 50 "newest" will have a movie page module displaying trailers from the recently released movie "Spider Man 3" and a news module listing the latest news bulletins collected from one or more news sources.

In one embodiment, the system maintains a list of words 50 and a list of appropriate page modules 52 for various types of content related to each of the words 50 in the list. For example, for word 50 "newest" the system may have a movie module, a games module, a music module, a news module, and a gossip module, etc. in the list. Hence, in this example, a word page generated for word 50 "newest" will have a movie module, a games module, a music module, a news module, and a gossip module, by default. In one embodiment, words 50 and page modules 52 are maintained and updated by the information editors with the help of user's browsing patterns, latest stories about various celebrities, products, etc., various topics that users may be interested in, the latest news, etc. Content are grouped in different categories such as content related to a particular subject or word suitable or liked to a particular segment of users. In one embodiment, contents are regularly and continuously updated to keep up with the latest developments. In another embodiment, various types of contents are scanned and obtained from various electronic media sources automatically, based on context based search filters.

Figure 2:
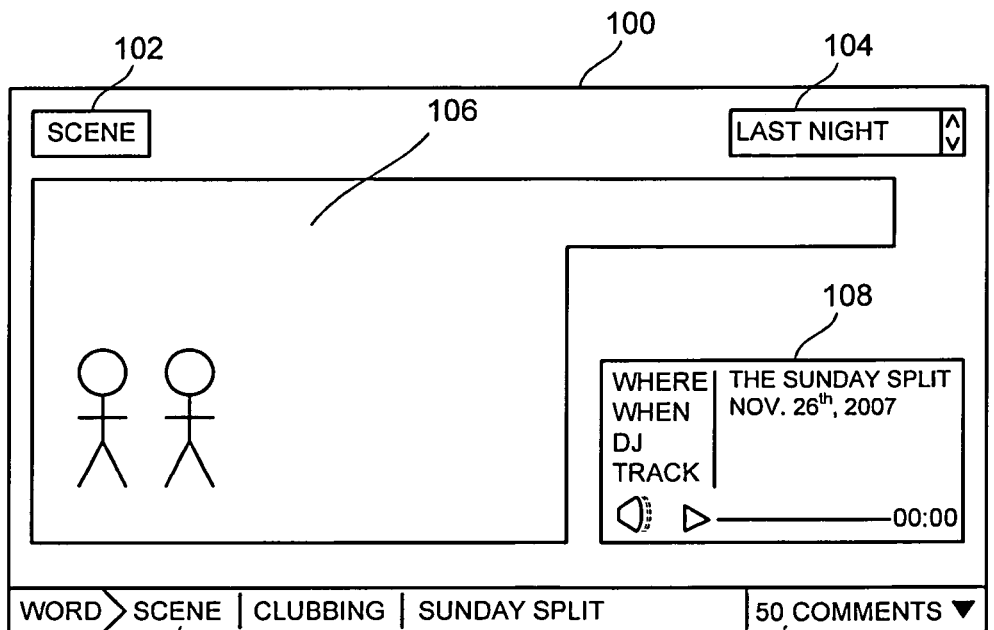
FIG. 2 illustrates a page module layout showing various placeholders of a page module, in accordance with one embodiment of the present invention.

FIG. 2 illustrates a page module layout 100. In one embodiment, the page module layout 100 includes a title 102, a filter 104, a interactive media space 106, a media metadata placeholder 108, a word bar 110, and a comments control 112. The page module layout 100 is capable of being modified to accommodate different types of content. For example, media metadata placeholder 108 may be made invisible to enable interactive media space 106 to be used for a full screen media display. In another example, interactive media space 106 may be broken up into two or more media spaces for showing multiple media content simultaneously or side-by-side. In yet another example, a section of interactive media space 106 may be used for playing a video while other sections may be used for displaying thumbnail pointers to other media content. In another embodiment, a page module may not include the word bar 110. In yet another embodiment, a page module may not include one or more of the media metadata placeholder 108, the filter 104, and the comments control 112.

The title 102 is used to display a title of content of a page module 52, sponsored module 54, or, favorite module 56. Text displayed in the title 102 is also a word 52, i.e. the title is selectable by a user and such selection would also triggers a generation of a new word page focused around the word 50 in the title 102. In one embodiment, some of the commonly used titles are music, movie, latest, gossip, etc. Title 102 is generally a topic name of content in the page module 52. For example, a page module 52 with title 102 text "music" will have contents either directly or contextually related to music.

Still referring to FIG. 2, because title 102 is also a word 50 that has its own context around it, selecting the title 102 will generate a new word page to display various page modules 52 centered or focused around the word. For example, in a word page focused around word 50 "Lindsay Lohan" that contains a module named "Music" (i.e. "Music" is the title 102 of the page module 52) featuring the music of "Lindsay Lohan", selecting (or clicking) on the title 102 of "Music" page module 52 would cause generation of a new word page now focused at music. This new word page will, for instance, have page modules 52 focused on classical music, newest music album, heavy metal, jazz, etc., all centered around and focused on "Music". Thus, as used herein, a word does not have to be a single word, but can be a set of words to define a person, place or thing. A word, however, is different than a phrase which may be in the form of a sentence. Therefore, broadly speaking, a word can be a single word or tight collection of words that convey context.

Thus, cyclic generation of word pages that include only contextually relevant and highly focused information provide a higher degree of browsing experience because the user is not forced to jump from one website to another website in search of relevant content.

In one embodiment, the comments control 112 has two states i.e. a closed state and an expanded state. In closed state, the comments control 112 shows a number referring to a number of comments written by the users for a page module 52 that includes a particular type of content focused on a particular word 50. Word 50 relates to a concept, person, brand, etc and functions as a carrier of meaning. The comments control 112 may be expanded by selecting or clicking on the word. In the expanded form, the comments control 112 displays a full text of comments and replies to these comments. In one embodiment, a reply can be entered for a comment, a reply may also be entered for a reply to a comment, and so on. The comments and replies are laid out for easy identification between a comment and a reply.

A comment or a reply or a reply to a reply may be in textual form, an audio form, or in an audio visual or audio-video form. The expanded view of the comments control 112 provides functionality to control the audio and visual aspects of audio or audio-visual comments through volume and video controls provided therein.

Figure 3:
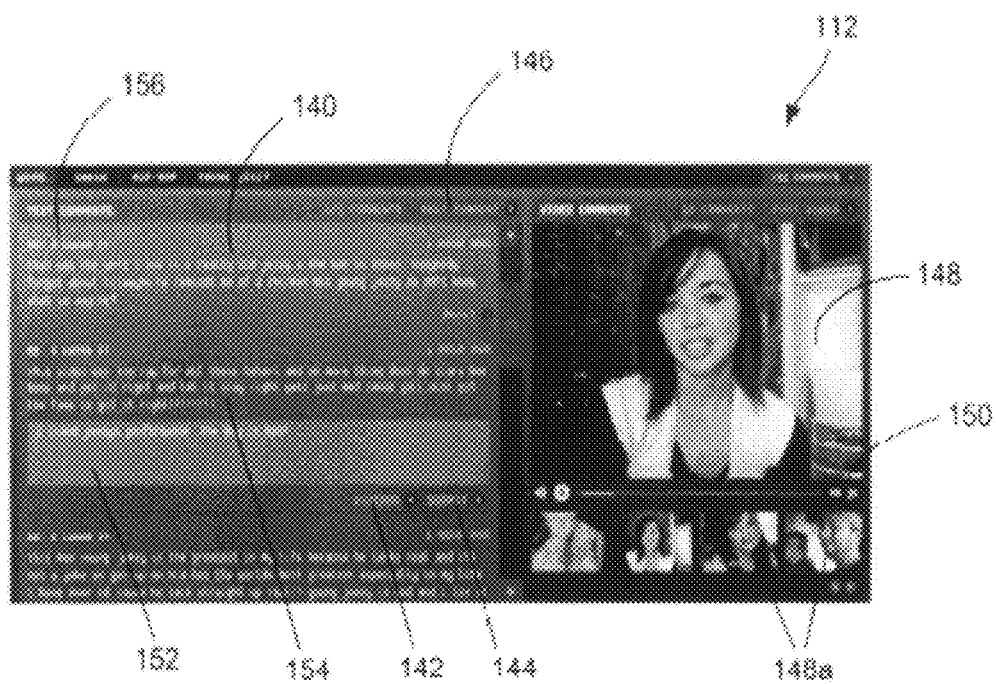
FIG. 3 illustrates an expanded view of the comment control on a page module, in accordance with one embodiment of the present invention.

FIG. 3 illustrates an expanded view of a the comment control 112 on a page module 52. When the page module 52 is displayed, a search is conducted in a data store (e.g. relational database) for user comments on various pieces of content in the page module 52. All user comments thus found are displayed in the comment control 112. The user comments include replies to the user comments. In one embodiment, replies to the user comments are displayed differently in the comment control 112 for easy identification.

Users may enter or leave comments on the content of the page module 52 in various forms. In one embodiment, a user comment is in textual form. In another embodiment, the user comment is in audio form. In yet another embodiment, the user comment is in audio-video (AV) form.

Referring back to FIG. 3, a text comment 140 is entered by a user using a text keypad or any other text input devices. "Post Comment" 146 control enables users to enter new comments. "Reply" 154 control enables users to enter a reply to a pre-existing comment. When the "Post Comment" 146 control or the "Reply" 154 control is clicked or selected, a text edit control 152 is created to enable text entry. The user may enter a text in the text edit control 152 and select "submit" 144 control to save the comment in a persistent storage. Contextual relationships between the comment and the content of the page module 52 are also stored when "submit" 144 control is clicked or selected. The user id of the user is also stored with the comment. In one embodiment, a comment may be entered anonymously; in that case, the comment is stored in the persistent data stored without a user id of the user who entered the comment. The user may choose to discard entered text by selecting "Discard" 142 control, and in that case the comment is not stored in the data store.

Still referring to FIG. 3, the comments control 112, in one embodiment, displays all comments and replies entered or left by users in the past for the content of the page module 52. The display of comments includes the text of comment, the user id of the user who entered the comment, time of entering the comment or reply, etc. In another embodiment, the comments control 112 also displays video comments left or entered by the users. The display of video comments 148 includes a thumbnail including a snapshots 148a of the video comments 148. A audio and video controller 150 is also included to enable users to control audio or visual aspects of the video comment 148. A user can play a video comment 148 by selecting respective thumbnail 148a. In one embodiment, the video comment 148 also includes subtitles in a user selected language. In another embodiment, the voice in the video comment 148 is converted into a textual form and stored as a text comment. The subject context of a video comment 148 is analyzed using a textual conversion of the voice in the video comment 148.

In one embodiment, users with special privileges are authorized to manage the user comments. The managing includes editing and deleting one or more user comments. In one example, managing also includes removing objectionable (e.g. obscene words or scenes) words, phrases, pictures, and videos from the user comments. In one example, the objectionable parts of the user comments are removed programmatically by defining programming rules and maintaining a list of objectionable content including word and phrases. The list of objectionable content is used by the rules to scan and filter out objectionable content from the comment data of the user comments. In another example, the objectionable parts of the user comments are removed by the content editors or administrators of the page modules. In another embodiment, any user may edit any comment entered by any user. An edit tracking information is maintained for every edited comment.

Figure 4:
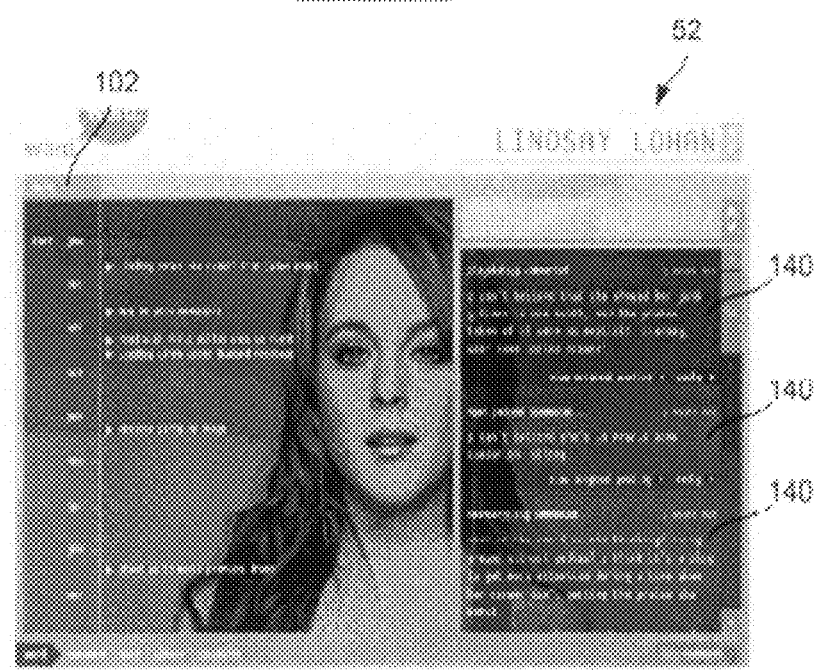
FIG. 4 illustrates comment aggregation, in accordance with one embodiment of the present invention.

FIG. 4 illustrates a "buzz" module 52 for illustrating comment aggregation process. In one example, users enter comments that are either directly or contextually related to "Lindsay Lohan". The comments are entered in various page modules 52 in the word web site. The comments may have been entered in the page modules 52 that are not directly related to word 50 "Lindsay Lohan". The "buzz" module focused around word 50 "Lindsay Lohan" aggregates 140 all the comments that are contextually related to either word 50 "Lindsay Lohan" or any event related to "Lindsay Lohan". In one embodiment, the aggregation of comments is done through searching a relational database for the comments for any page module or object in the word web site so long as the comments are contextually related to word 50 "Lindsay Lohan".

Still referring to FIG. 4, in one embodiment, new comments may be added to the aggregated comments. Replies to the comments may also be entered. Entered comments or replies and their contextual relationships with various content in the word website are stored back in the relational database. In other embodiments, other types of data storage systems such as object database, LDAP, Active Directory, etc. may be used.

Figure 5:
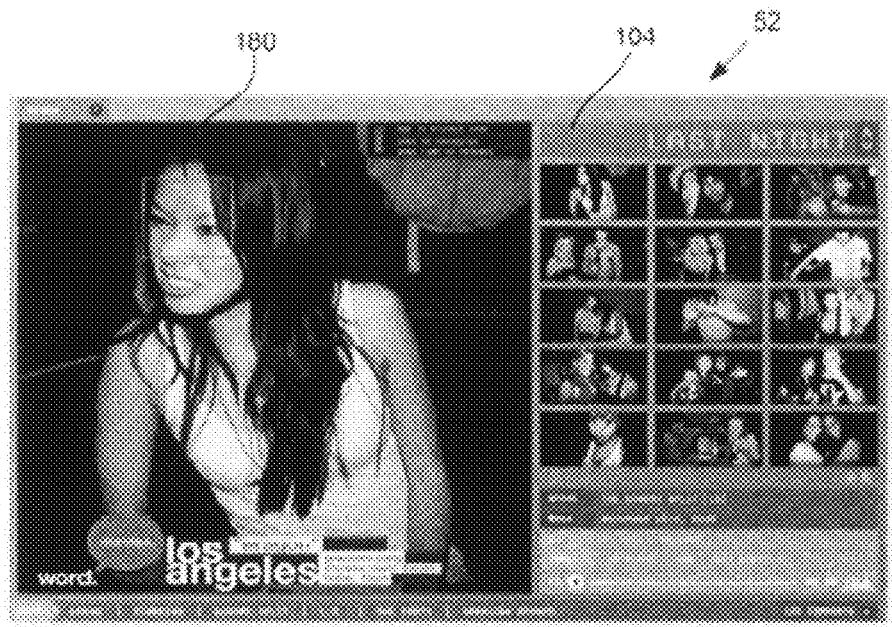
FIG. 5 illustrates entering comments to a part of a picture in a scene page module, in accordance with one embodiment of the present invention.

FIG. 5 illustrates entering comments on parts of the visual objects (such as pictures) in the page modules. The page module is a scene page module 52 in this example. The pictures being displayed in the scene page module 52 are filtered by a "last night" filter 104 i.e. all pictures being displayed are related by an event. A user desiring to enter a comment for a particular part 180 of the picture in the page module 52 marks the part 180 by using a computer mouse or any other user interface provided by the computer system including a graphical operating system. The page module 52 displays an edit box for enabling the user to enter a text comment. In another embodiment, the page module 52 displays a file upload control to enable the user to upload a media file as a comment. In one embodiment, the media file includes the comment in audio form. In another embodiment, the media file includes the comment in audio-video form.

Still referring to FIG. 5, a unique identification is generated for every marked part of the picture and is used to store the comment on this part in a persistent database. In one embodiment, the unique identification includes the identification of the page module 52. In one example, when the picture is displayed again anywhere in the word website, the part of the picture that has a user comment, is displayed using a distinguishing markings to enable users to appreciate that one or more comments are associated with the part. In another example, the distinguishing markings are only displayed when the mouse pointer is brought over the picture.

Figure 6:
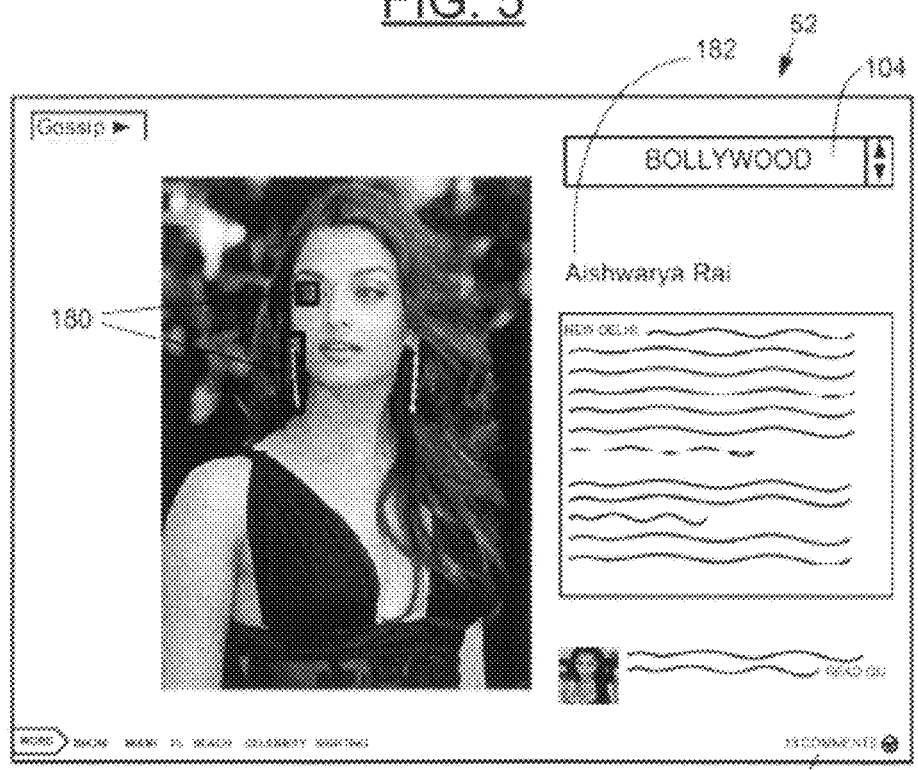
FIG. 6 illustrates entering comments to parts of a picture in a gossip page module, in accordance with one embodiment of the present invention.

FIG. 6 illustrates that a comment may be entered for any picture being displayed in any page module 52. The page module in one example is a gossip page module 52 focused on word 50 "Aishwara Rai" 182. The comments control 112 can be used to enter comments for the content of the page module 52. In the picture of Aishwara Rai, parts 180 have been marked by the user to entering comments on these parts 180. In one embodiment, comments entered for the parts 180 would also appear in list of comments entered for the page module 52 in general. In another example, wherever this particular picture of Aishwara Rai is displayed in the word web site, the comments left for the parts 180 would appear in the comments control 112 of the page module that is displaying this picture. Furthermore, the comments for the parts 180 can also be viewed by hovering the mouse pointer on the parts 180.

Figure 7:
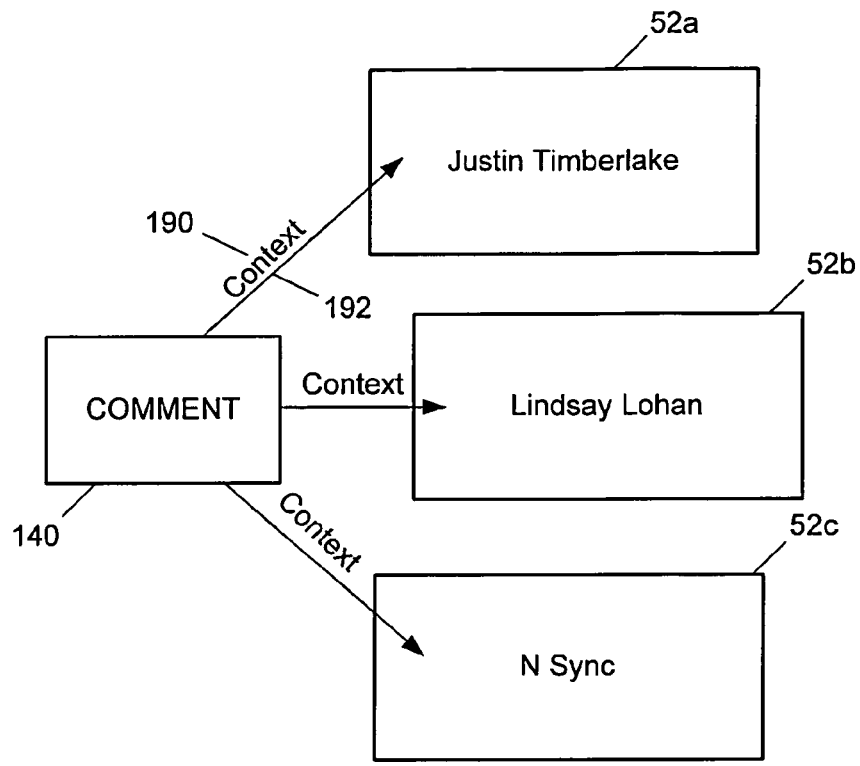
FIG. 7 illustrates comments carry over based on contextual relationships among content of various page modules, in accordance with one embodiment of the present invention

FIG. 7 illustrates structure of associating user comments with content of other page modules. A user comment 140 is analyzed for identifying contextual relationships with the content of other page modules in the word website. For example, a user comment 140 is entered in a page module that is contextually related to "Lindsay Lohan" 52a, the user comment 140 will be associated with the content of one or more page modules that are contextually related to "Justin Timberlake" 52b if the user comment 140 also talks about "Justin Timberlake" (e.g. the comments states "Justin is a good singer"). The comment 140 will also be associated with a page module that is contextually related to "N-Sync" 52c because "Justin Timberlake" is associated with "N-Sync" and the user comment 140 is about music. In one embodiment, the comment analyzing is done by the editors of the word website. In another embodiment, the comment analyzing is done programmatically by defining rules for comment analysis and using content relationships stored in the relational database.

Still referring to FIG. 7. In one embodiment, the user comment 140 is associated with other contextually related page modules by physically copying the content of the user comment 140 to the comment storages of other modules. In another embodiment, the associating is done via providing pointers to the comment storage, hence, storing only one physical copy of the user comment 140 in the database.

Figure 8:
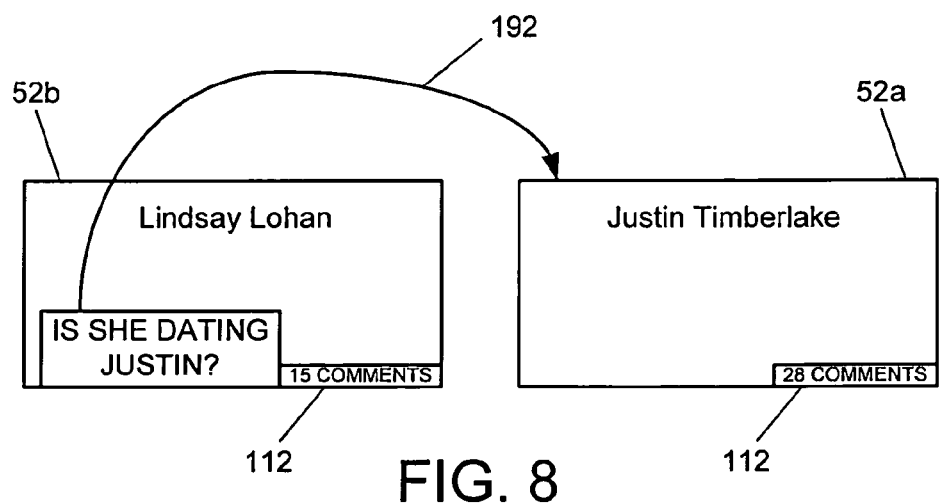
FIG. 8 illustrates a comment carryover process between two page modules based on contextual relationships between content of a comment on one page module and content of the other page module, in accordance with one embodiment of the present invention.

FIG. 8 further illustrates the association of the user comment 140 within the contextually related page modules. In one example, the user comment 140 entered in a page module contextually related to "Lindsay Lohan" 52b is "Is she dating Justin?". Even though the full name of "Justin Timberlake" has not been provided in the user comment 140, the contextually relationship analysis provides that the user comment 140 is most likely contextually related to "Justin Timberlake" and not to just any "Justin". Hence, in this example, the user comment 140 is carried over to "Justin Timberlake" buzz page module 52a.

Figure 9:
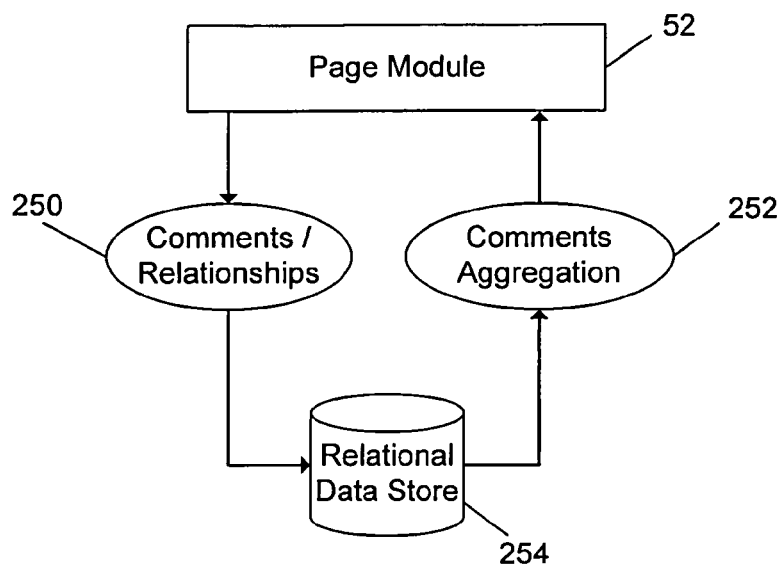
FIG. 9 illustrates structure of a system for storing and retrieving comments and relationships in a data store, in accordance with one embodiment of the present invention.
Figure 10:
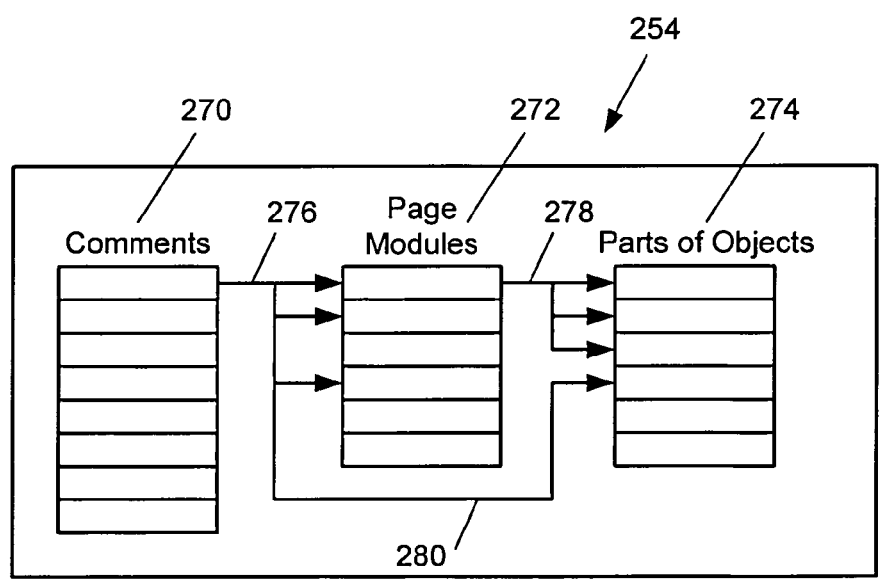
FIG. 10 illustrates structure of a relational database that stores comments and contextual relationships of the content.

FIGS. 9 and 10 illustrate structure of the system for storing comments in a persistent relational database 254. The system includes modules for analyzing comments and contextual relationships 250 and aggregating comments 252 to display the aggregated comments on a page module. In one embodiment, when a comment is entered in a page module, one or more programming modules analyze the comment to identify contextual relationships. In another embodiment, the analyzing of the comment is done manually by the content editors. Based on the analysis of the comment, the comment and contextual relationships of the comment with other page modules or objects in the word website are stored in the relational database 254. During a read cycle in which a page module requests the aggregation programming module 252 to provide a group of comments in a given context, the aggregation programming module 252 reads the relational database 254 to retrieve comments contextually associated with various content based on the subject context of the page module.

Referring to FIG. 10, exemplary structure of internal storage in the relational database 254 is illustrated. Comments are stored in a comment table 270. Each comment in the comment table 270 maintains association links 276 with one or more page modules, the identification of the page modules is stored in the page module table 272. In one embodiment, the maintaining of association links includes storing references to the page modules with the comment in a form that enables retrieval the page modules through the use of stored references. Each page module in the page module table 272 maintains association links with one or more objects or parts thereof, the identification of the objects and/or their parts is stored in parts of objects table 274. Each comment in the comment table 270 maintains association links 280 with one or more entries in parts of objects table 274. The tables in the relational database 254 are indexed to speedup searching of contextual relationships among the comments, the page modules, and parts of the objects.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules, page modules, and, subsystems described in this document can be implemented using a programming language such as Flash, JAVA, C++, C, C#, Visual Basic, JAVA Script, PHP, XML, HTML etc., or a combination of programming languages. Commonly available application programming interface (API) such as HTTP API, XML API and parsers etc. are used in the implementation of the programming modules. As would be known to those skilled in the art that the components and functionality described above and elsewhere in this document may be implemented on any desktop operating system which provides a support for a display screen, such as different versions of Microsoft Windows, Apple Mac, Unix/X-Windows, Linux etc. using any programming language suitable for desktop software development.

The programming modules and ancillary software components, including configuration file or files, along with setup files required for installing the widget dock and related functionality as described in this document, are stored on a computer readable medium. Any computer medium such as a flash drive, a CD-ROM disk, an optical disk, a floppy disk, a hard drive, a shared drive, and an storage suitable for providing downloads from connected computers, could be used for storing the programming modules and ancillary software components. It would be known to a person skilled in the art that any storage medium could be used for storing these software components so long as the storage medium can be read by a computer system.

The invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

While this invention has been described in terms of several preferable embodiments, it will be appreciated that those skilled in the art upon reading the specifications and studying the drawings will realize various alternation, additions, permutations and equivalents thereof. It is therefore intended that the present invention includes all such alterations, additions, permutations, and equivalents as fall within the true spirit and scope of the invention.

What is claimed is:

1. A computer-implemented method of aggregating and carrying over comments in a page module, the computer-implemented method comprising:
   enabling a user to enter a comment about an object in the page module;
   analyzing content of the comment;
   identifying related page modules that are contextually related to content of the comment based on the analyzing, the comment being automatically tagged with a context association, wherein the related page modules are contextually related to the content of the comment when content of the related page modules have some descriptive interrelated connection to or from the content of the comment, wherein the page module and the related page modules each have a subject context that is contextually related to a word;
   aggregating the comment to the page module;
   carrying over the comment as text to at least one of the related page modules based on the context association; and
   storing an association link between the comment and the page module and the association link between the comment and the related page modules in a relational database;
   wherein presenting the page module or the related page modules presents the entered comment, that was aggregated and carried over, for viewing.

2. The computer-implemented method as recited in claim 1, wherein the object is a picture.

3. The computer-implemented method as recited in claim 1, wherein the object is an audio-video (AV).

4. The computer-implemented method as recited in claim 1, wherein the object is a music album.

5. The computer-implemented method as recited in claim 2, wherein the object is a selected part of the picture.

6. A computer-implemented method of enabling a user to add a comment to a selected part of a visual object in a page module, the method comprising:
   enabling the user to mark the selected part of the visual object;
   enabling the user to add the comment about the selected part of the visual object in the page module;
   generating an internal identification of the selected part, the internal identification includes identification of the page module;
   associating the internal identification of the selected part with the comment;
   examining content of the comment;
   identifying related page modules that are contextually related to the comment based on the examining, the comment being automatically tagged with a context association;
   aggregating the comment with the page module; and
   carrying over the comment as text to the related page modules based on the context association;
   wherein the page module and the related page modules each have a subject context that is contextually related to a word and wherein presenting either the page module or the related page modules presents the entered comment, that was aggregated and carried over, for viewing.

7. The computer-implemented method as recited in claim 6, wherein the associating further comprising:
   storing the internal identification of the selected part and the comment together in a persistent storage.

8. The computer-implemented method as recited in claim 6, wherein the visual object is a picture.

9. The computer-implemented method as recited in claim 6, wherein the comment is a text comment.

10. The computer-implemented method as recited in claim 6, wherein the comment is an audio comment.

11. The computer-implemented method as recited in claim 6, wherein the comment is an audio-video comment.

12. A computer-implemented method for managing comment data generated when interacting with a page module, the computer-implemented method comprising:
   detecting at least one comment data being expressed when interacting with the page module, the comment data being text;
   analyzing content of the comment data to identify a context for the comment data;
   if the comment data is identified to be associated with a context based on the analyzing, tagging the comment data with a context association, and if the comment data is not associated with a context then maintaining the comment data associated only with the page module; and
   carrying over the comment data as text to one or more other page modules that were identified to have the context association with the comment data;

wherein the populating enables display presentation of the comment data aggregated at the page module and carried over to one or more page modules having the context association;

wherein the page module and the related page modules each have a subject context that is contextually related to a word.

13. The computer-implemented method for managing comment data as recited in claim 12, wherein the comment data being expressed is expressed by entering a text comment on a selected object in the page module.

14. The computer-implemented method for managing comment data as recited in claim 12, wherein the comment data being expressed is expressed by entering an audio comment on a selected object in the page module.

15. The computer-implemented method for managing comment data as recited in claim 12, wherein the analyzing includes looking up stored relationships in a relational database.

16. The computer-implemented method for managing comment data as recited in claim 12, wherein the populating includes adding the comment data to comment table in a relational database and associating the comment data to identifiers of one or more other page modules that were identified to have a context association with the comment data.

17. A method for managing comment data generated when interacting with a page module over the Internet, the method comprising:

detecting at least one comment being expressed when interacting with the page module, the comment data being text;

analyzing content of the comment data to identify a context for the comment data;

tagging the comment data with the context; and carrying over only the comment data to one or more other page modules that are identified to have an association with the context based on the analyzing, the carrying over enables display presentation of the comment data on one or more page modules having the identified context;

wherein the method is executed by a processor.

18. The computer-implemented method as recited in claim 17, wherein the comment data is expressed by receiving the text as associated with an object in the page module.

19. The computer-implemented method as recited in claim 17, wherein the comment data is expressed by receiving an audio comment as associated with an object in the page module.

* * * * *